United States Patent
Sundara-Rajan et al.

(10) Patent No.: US 9,740,313 B1
(45) Date of Patent: Aug. 22, 2017

(54) METHOD AND DEVICE FOR REPLACING STYLUS TIP

(71) Applicant: Amazon Technologies, Inc., Seattle, WA (US)

(72) Inventors: Kishore Sundara-Rajan, San Jose, CA (US); Zachary Lawrence Brand, Mountain View, CA (US); Piotr Pawel Blaszczak, Sunnyvale, CA (US); Ann Yuhui Yun, Mountain View, CA (US); Timothy Michael Vanderet, San Francisco, CA (US); Miguel Angel Morales, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/005,165

(22) Filed: Jan. 25, 2016

Related U.S. Application Data

(63) Continuation of application No. 14/313,701, filed on Jun. 24, 2014, now Pat. No. 9,244,543.

(51) Int. Cl.
  *G06F 3/041* (2006.01)
  *G06F 3/0354* (2013.01)

(52) U.S. Cl.
  CPC ........ *G06F 3/03545* (2013.01); *G06F 3/0414* (2013.01); *G06F 3/0416* (2013.01)

(58) Field of Classification Search
  CPC .... G06F 3/03545; G06F 3/038; G06F 3/0383; G06F 3/0386; G06F 3/0414; G06F 3/0416; G06F 3/04883; G06K 9/222
  See application file for complete search history.

(56) References Cited

U.S. PATENT DOCUMENTS

| | | | | |
|---|---|---|---|---|
| 4,316,197 A * | 2/1982 | Hubbard | .................. | B43K 7/10 346/140.1 |
| 5,004,872 A * | 4/1991 | Lasley | .................... | G06F 3/046 178/19.04 |
| 5,239,138 A * | 8/1993 | Kobayashi | ............ | G06F 3/0433 178/18.04 |
| 5,621,438 A * | 4/1997 | Kamimura | ............ | G06F 1/1613 345/156 |
| 2002/0062572 A1* | 5/2002 | Bindell | ..................... | G01B 5/20 33/546 |
| 2004/0070573 A1* | 4/2004 | Graham | .............. | G06F 3/04883 345/179 |
| 2012/0206360 A1* | 8/2012 | Tuan | ................... | G06F 3/03542 345/166 |
| 2012/0242603 A1* | 9/2012 | Engelhardt | ......... | G06F 3/03545 345/173 |
| 2013/0106794 A1* | 5/2013 | Logan | ..................... | G06F 3/044 345/179 |

(Continued)

*Primary Examiner* — Joe H Cheng
(74) *Attorney, Agent, or Firm* — Pierce Atwood LLP

(57) ABSTRACT

Systems, methods, and devices for monitoring use of a tip of a stylus, determining an amount of wear of or life remaining in the tip, and notifying a user when to replace the tip are disclosed. The tip should be replaced to avoid an abrasive material of the tip from being exposed and contacting a touch screen or other surface of a computing device to avoid scratching or otherwise damaging the touch screen or other surface of the computing device. The computing device or the stylus device may perform one or more of the monitoring, determining, or prompting steps.

15 Claims, 8 Drawing Sheets

(56) References Cited

U.S. PATENT DOCUMENTS

| | | | | |
|---|---|---|---|---|
| 2013/0106795 A1* | 5/2013 | Sundara-Rajan | | 345/179 |
| 2013/0199311 A1* | 8/2013 | Horie | | G01L 1/142 |
| | | | | 73/862.626 |
| 2013/0207937 A1* | 8/2013 | Lutian | | G06F 3/042 |
| | | | | 345/175 |
| 2014/0062968 A1* | 3/2014 | Skinner | | G06F 3/03545 |
| | | | | 345/179 |
| 2014/0069532 A1* | 3/2014 | Obata | | G06F 3/046 |
| | | | | 137/554 |
| 2014/0253467 A1* | 9/2014 | Hicks | | G06F 3/033 |
| | | | | 345/173 |
| 2014/0300585 A1* | 10/2014 | Dowd | | G06F 3/0416 |
| | | | | 345/179 |
| 2014/0306929 A1* | 10/2014 | Huang | | G06F 3/03545 |
| | | | | 345/174 |
| 2015/0109263 A1* | 4/2015 | Hargreaves | | G06F 3/03545 |
| | | | | 345/179 |

* cited by examiner

METHOD AND DEVICE FOR REPLACING STYLUS TIP

CROSS-REFERENCE TO RELATED APPLICATION DATA

This application is a continuation of, and claims priority to, U.S. patent application Ser. No. 14/313,701 filed Jun. 24, 2014, now U.S. Pat. No. 9,244,543, in the name of Kishore Sundara-Rajan et al. The above application is herein incorporated by reference in its entirety.

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings.

DETAILED DESCRIPTION

A stylus may be equipped with a soft material tip to avoid damaging a screen surface of a computing device during normal use. Such soft tips, however, tend to wear with use. After repeated use, an abrasive material of the tip may become exposed. When this abrasive material comes into contact with a touch screen or other surface of a computing device, the abrasive material may scratch or otherwise cause damage to the touch screen or other surface. This damage may be avoided by replacing the tip before it wears and the abrasive material is exposed. Users, however, may not be able to easily tell upon usual inspection when a tip should be replaced, which may result in accidental damage to another device if a tip is not replaced in time.

To determine when a tip should be replaced, the computing device may track the length and/or number of strokes the tip makes on the touch screen. The computing device may then display one or more prompts to the user indicating a remaining life or amount of wear of the tip, and prompt the user to replace the tip at appropriate thresholds. To determine the remaining life or amount of wear of the tip, the computing device may integrate over time the position of the tip to arrive at the total length of travel.

Alternatively, or in addition to the computing device tracking the wear of the tip, the stylus device may monitor an amount of non-zero pressure over time (i.e., when the user is using the stylus device), and determine the remaining life or amount of wear of the tip based on pressure and time measurements. When the remaining life or amount of wear reaches or exceeds a threshold, the stylus device may then communicate a message to the computing device to display a prompt to the user (or activate a built-in indicator) indicating that the tip should be replaced, an amount of life remaining for the tip, and/or and amount of wear of the tip. This allows the user to be warned or told to replace the tip prior to the tip causing any damage to the touch screen or other surface.

Figure 1:
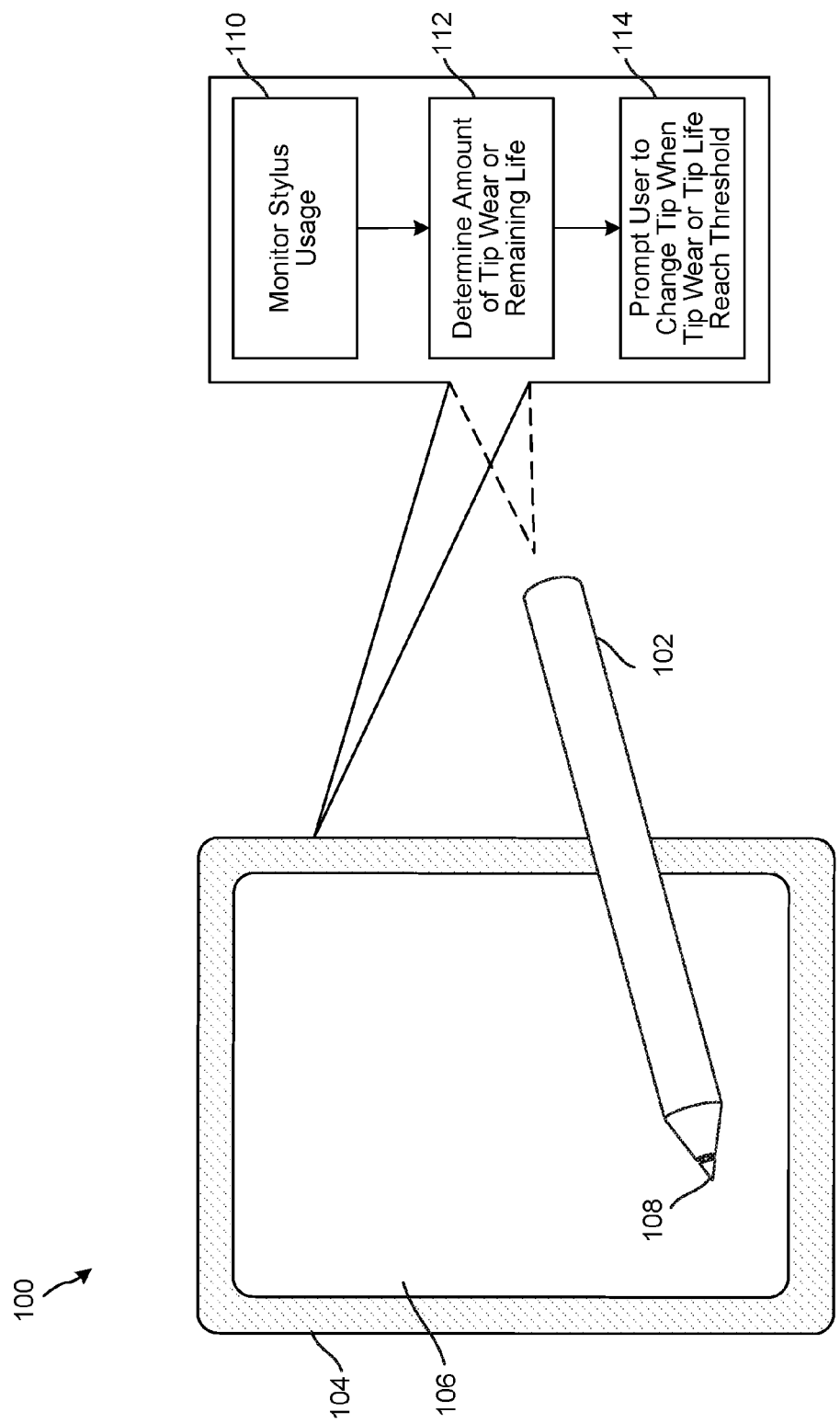
FIG. 1 illustrates an overview of a system for implementing embodiments of the present disclosure.

FIG. 1 illustrates an overview of a system 100 for implementing embodiments of the disclosure. The system includes a stylus device 102 and a computing device 104 having a touch screen 106. The stylus device 102 may be an active capacitive type stylus or a passive type stylus. When the stylus device 102 is an active capacitive type stylus, a tip 108 or other portion of the stylus device 102 may generate a first signal (such as, an electric field generated by the stylus device at an operating frequency) to communicate data or operating information to the computing device 104. The computing device 104 may also generate a second signal (such as, an electric field of the computing device) to allow the computing device 104 to determine a position of the stylus device 102. For example, antennae of the touchscreen 106 of the computing device 104 may be activated to generate the second signal. The tip 108 may receive and may amplify the second signal. The stylus device 102 may then transmit the amplified signal (or the first signal) to the computing device 104 to allow the computing device 104 to determine a position and movement of the stylus device 102.

The computing device 104 and/or the stylus device 102 may monitor the stylus usage, illustrated as block 110, by monitoring the position and length of strokes or movements the tip 108 makes on the touch screen 106, an amount of time the tip 108 is in contact with the computing device 104, and/or an amount of pressure at the tip while in contact with the computing device 104. The computing device 104 may then determine an amount of tip wear or amount of remaining life of the tip 108, illustrated as block 112. This may be determined by integrating over time position reports of the movement of the tip 108 from a touch controller of the computing device 104 to arrive at the total length of travel. The computing device may then display one or more prompts to the user indicating a remaining life of the tip 108, an amount of wear of the tip 108, or to replace the tip at appropriate thresholds, illustrated as block 114. This warns or tells the user to replace the tip 108, thereby avoiding any damage to the touch screen 106 or other surface of the computing device 104. Alternatively, the stylus 102 may perform steps 110-114 on its own or in communication with one or more computing devices 104, as described below.

Figure 2:
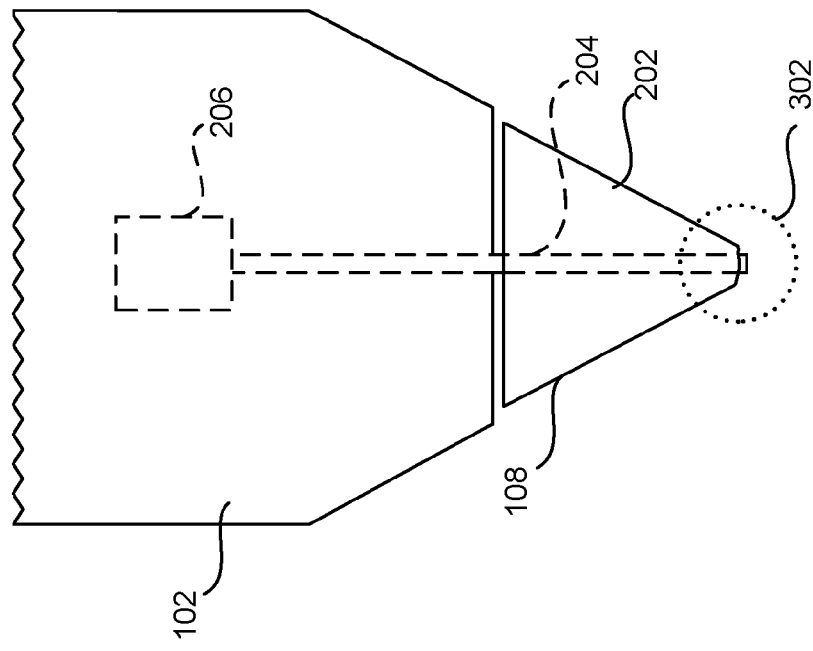
FIG. 2 illustrates a tip portion of an exemplary stylus device according to embodiments of the present disclosure.
Figure 3:
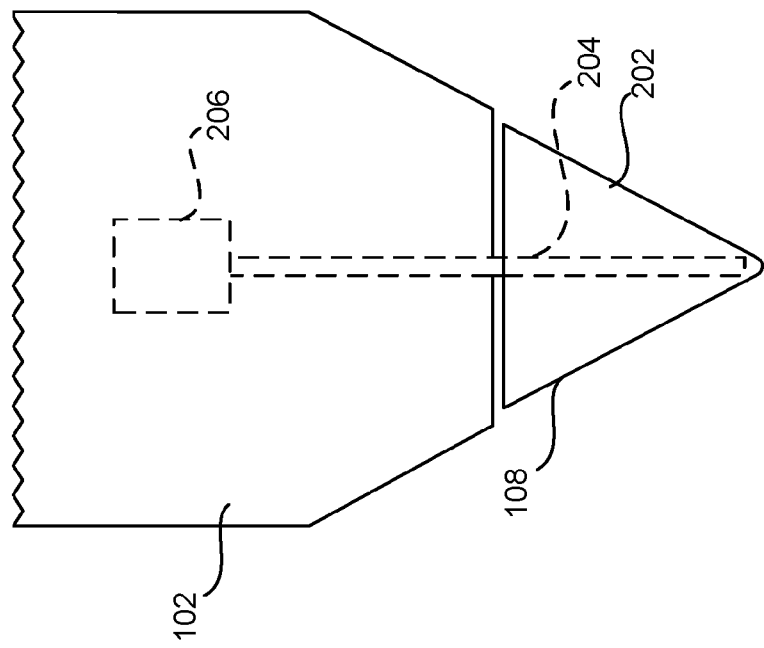
FIG. 3 illustrates a worn tip portion of the exemplary stylus device according to embodiments of the present disclosure.

FIGS. 2 and 3 illustrate an exemplary tip portion of the stylus device of the present disclosure. As illustrated in FIG. 2, the tip 108 is unworn and suitable to use in conjunction with a touch screen of a computing device. As illustrated in FIG. 3, the tip 108 (shown in circle 302) is worn and unsuitable to use in conjunction with the touch screen of the computing device. As illustrated in FIGS. 2 and 3, the tip 108 is replaceable, meaning that the tip 108 may be removed from the stylus device 102 and a new tip may be coupled to the stylus device 102.

The tip 108 may be a multi-component mechanical part including a conductive polymer coating 202 molded over an abrasive core material or layer of the tip 108. For example, the tip 108 may be composed of multiple layers in which conductive polymer coating 202 is the outer layer. In one example, the abrasive core material may be a metallic shaft or metallic core 204. The conductive polymer 202 of the tip 108 may allow the tip 108 to function as an electrode and electromagnetically transmit and receive information to and from the computing device. The conductive polymer 202 may be a soft polymer, a medium polymer, and/or a hard polymer. A hard polymer coating tends to have a sliding feel against the touch screen and erodes or wears slower than softer polymer coatings. A soft polymer coating tends to grip the touchscreen more than hard polymer coatings and, therefore, may erode or wear faster than harder polymer coatings. Different tips may be preferred by different users.

Because of the differing wear properties of different polymer coatings that may be used in the tip 108, the stylus device 102 or the computing device may identify the tip 108 being used in order to correctly track the wear of the tip 108. In this respect, the tip 108 may include a data element that can be used to identify the type of tip and/or wear model of the tip. The tip 108 may have an electrical impedance associated with the tip 108, and the stylus device 102 and/or the computing device may identify the type of tip and/or wear model associated with the tip based on the impedance. The user may simply input or select the type of tip 108 (for example, the model number, serial number, brand, type, or other identifying information) being used through the stylus device 102 or the computing device. The stylus 102, itself, may also be associated with an identifier that may be used with tip usage/change data to determine when a tip should be changed. These mechanisms and/or methods may also be used to identify when the tip 108 has been changed.

The metallic core 204 may be coupled to a force sensor 206. The force sensor 206 may measure an amount of force (for example, pressure, shear, and/or other force in any direction) at the tip 108, and may be for example, an optical pressure sensor, a capacitive pressure sensor, a piezoelectric sensor, a piezoelectric resistive sensor, or other sensor capable of measuring force and/or pressure. There may be more than one force sensor to measure force in any direction that occurs at the tip 108. The force sensor 206 may also be used to identify when the tip 108 has been changed. For example, the force sensor 206 may measure a negative force (or force that is falls below a non-use force or neutral force measurement) that bounces back to zero or neutral when the tip 108 is removed or pulled out of the stylus device 102. This force measurement may provide a signal that identifies when the tip 108 is changed. Additionally, there may be electric switches, capacitor changes, dielectric changes, key encodings, and or other signals that identify when the tip 108 is removed from the stylus device 102 and changed.

In general, the metallic core 204 coupled to the force sensor 206 provides a mechanical path from the tip 108 to the force sensor 206 to allow the force sensor 206 to measure the pressure at the tip 108. The metallic core 204 also provides a transmission path for carrying a signal (such as, an electric field or frequency of operation generated by the stylus device 102) from a controller or printed circuit board (PCB) of the stylus device 102 to the tip 108. This signal allows the stylus device 102 to communicate with the computing device, and allows the computing device to determine a location (x/y coordinates) of the stylus device 102 in relation to the touch screen of the computing device.

As the stylus device 102 is used, the conductive polymer 202 (or other tip material) may wear over time. The amount of wear and/or amount of use left in the tip 108, before the abrasive material or metallic core 204 becomes exposed (as illustrated in FIG. 3), defines a life of the tip 108. Different tip materials may be associated with different tip life times. When the life of the tip 108 reaches or exceeds a threshold, the tip 108 may need to be replaced to prevent the abrasive material or metallic core 204 being exposed and scratching or otherwise damaging the touch screen of the computing device when used.

Figure 4:
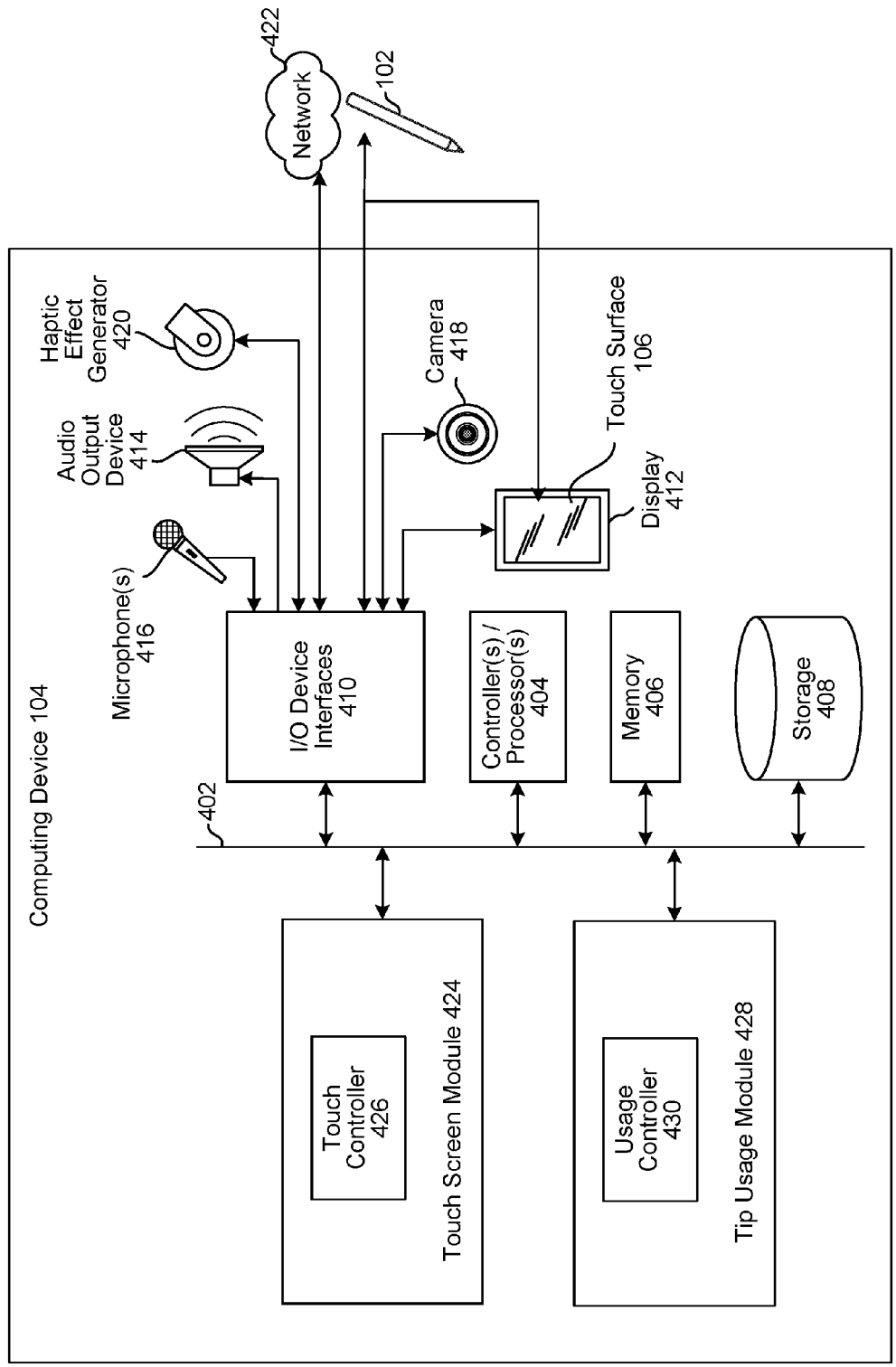
FIG. 4 is a block diagram conceptually illustrating example components of a computing device according to embodiments of the present disclosure.

In an embodiment, the computing device 104 may be used to monitor and determine/calculate an amount of life remaining in the tip 108 and notify a user of the amount of life remaining and/or to replace the tip 108. FIG. 4 is a block diagram conceptually illustrating example components of the computing device 104. In operation, the computing device 104 may include computer-readable and computer-executable instructions that reside on the computing device 104, as will be discussed further below.

As illustrated in FIG. 4, the computing device 104 may include an address/data bus 402 for conveying data among components of the computing device 104. Each component within the computing device 104 may also be directly connected to other components in addition to (or instead of) being connected to other components across the bus 402.

The computing device 104 may include one or more microcontrollers/controllers/processors 404 that may each include a central processing unit (CPU) for processing data and computer-readable instructions, and a memory 406 for storing data and instructions. The memory 406 may include volatile random access memory (RAM), non-volatile read only memory (ROM), non-volatile magnetoresistive (MRAM) and/or other types of memory. The computing device 104 may also include a data storage component 408, for storing data and microcontrollers/controller/processor-executable instructions (e.g., instructions to perform one or more steps of the methods illustrated in FIGS. 5 and 6). The data storage component 408 may include one or more non-volatile storage types such as magnetic storage, optical storage, solid-state storage, etc. The computing device 104 may also be connected to removable or external non-volatile memory and/or storage (such as a removable memory card, memory key drive, networked storage, etc.) through the input/output device interfaces 410.

Computer instructions for operating the computing device 104 and its various components may be executed by the microcontroller(s)/controller(s)/processor(s) 404, using the memory 406 as temporary "working" storage at runtime. The computer instructions may be stored in a non-transitory manner in non-volatile memory 406, storage 408, or an external device. Alternatively, some or all of the executable instructions may be embedded in hardware or firmware in addition to or instead of software.

The computing device 104 includes input/output device interfaces 410. A variety of components may be connected through the input/output device interfaces 410, such as a display 412 having a touch surface or touch screen 106; an audio output device for producing sound, such as speaker(s) 414; one or more audio capture device(s), such as a microphone or an array of microphones 416; one or more image and/or video capture devices, such as camera(s) 418; one or more haptic effect generators 420; and other components. The display 412, speaker(s) 414, microphone(s) 416, camera(s) 418, haptic effect generator(s) 420, and other components may be integrated into the computing device 104 or may be separate.

The display 412 may be a video output device for displaying images. The display 412 may be a display of any suitable technology, such as a liquid crystal display, an organic light emitting diode display, electronic paper, an electrochromic display, a cathode ray tube display, a pico projector or other suitable component(s). The display 412 may also be integrated into the computing device 104 or may be separate.

The input/output device interfaces 410 may also include an interface for an external peripheral device connection such as universal serial bus (USB), FireWire, Thunderbolt or other connection protocol. The input/output device interfaces 410 may also include a connection to one or more networks 422 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus device 102 may connect to the computing device 104 via one of these connections. The touch surface 106 and the stylus device 102 may also communicate data or operating information to one another to enable the computing device 104 to determine a position of the stylus device 102. Additionally, in some embodiments, the computing device 104 (for example, the touch surface 106) and the stylus device 102 may communicate using electromagnetic communications (for example, electric fields generated by each device to transmit data on a carrier frequency), and/or haptic communications.

The computing device 104 further includes a touch surface or touch screen module 424 that interacts with the stylus device 102. The touch screen module 424 may include a touch controller 426. The touch controller 426 receives and tracks location and position and other information from, and may cause the transmission of information to, the stylus 102 to enable the computing device 104 to interact with the stylus 102. In an embodiment, the touch controller 426 senses the stylus device 102 in contact with the touch screen to determine or receive location information of the stylus device 102 and other information from the stylus device 102.

The computing device 104 further includes a tip usage module 428 that receives the location and position information from the touch controller 426. The tip usage module 428 may include a usage controller 430. The usage controller 430 may determine/calculate the amount of wear and/or life remaining in the tip 108 and cause one or more messages to be displayed on the display 412 to the user relating to or corresponding to the amount of wear and/or life remaining in the tip (for example, a prompt to replace the tip). To determine/calculate the amount of wear and/or life remaining in the tip, the tip usage module 428/usage controller 430 may be programmed with or access from the storage 408 (or from another device) information regarding a number of tip wear models. The tip usage module 428/usage controller 430 may execute the appropriate wear model corresponding to the type of tip being used. The wear models may be numerical or other representation of how much life a tip has, and associated thresholds for motivating/managing tip replacement.

Figure 5:
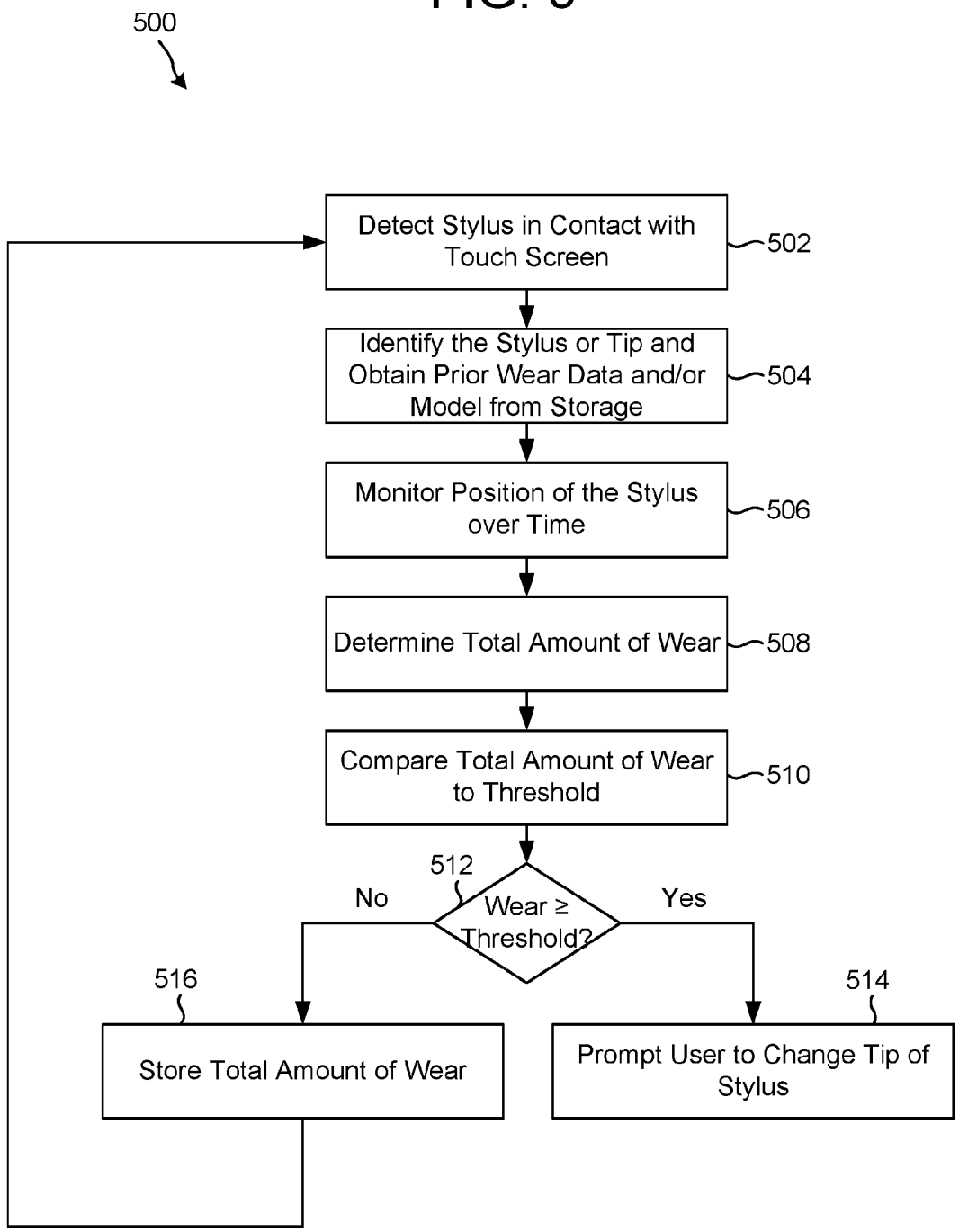
FIG. 5 illustrates an exemplary method of determining when to replace a tip of a stylus device according to embodiments of the present disclosure.

FIG. 5 illustrates an exemplary method 500 of determining when to replace a tip of a stylus device according to embodiments of the present disclosure. As illustrated, the computing device detects when a stylus device is in contact with the touchscreen of the computing device, illustrated as block 502. The computing device identifies the stylus or tip being used and obtains any prior wear data and wear model(s) associated with the tip from storage or from another device, illustrated as block 504. As described above, the tip may be identified from a data element in the tip, an electrical impedance associated with the tip, user input or selection, message from the stylus device, or other mechanism.

As the stylus is being used, the computing device monitors the position of the stylus over time, illustrated as block 506. The computing device then determines an amount of wear associated with the tip, illustrated as block 508. This may be performed by calculating the amount of wear using the appropriate wear model, any prior wear data and the recently monitored position and time information (i.e., distance over time). The wear model may utilize a fixed or assumed amount of force/pressure applied to the tip, and/or the computing device may measure force/pressure data corresponding to the tip or receive the force/pressure data from the stylus device.

In an embodiment, the amount of wear associated with the tip is generally a function of the distance traveled and the pressure/force (lateral and axial) exerted on the tip. Using these values the amount of wear associated with the tip may be computed. For example, the computing device may monitor and/or receive data on the position of the tip, and receive data corresponding to the force/pressure applied to the tip from the stylus device. In an example, the touch controller of the computing device may communicate this data to the processor and/or tip usage module/usage controller of the computing device via reports. The computing device may then compute the distance the stylus device has travelled based on these reports. For the $i^{th}$ report:

$$\text{Length/Distance of travel: } l_i = \sqrt{s_x(x_i - x_{i-1})^2 + s_y(y_i - y_{i-1})^2} \quad \text{(Eq. 1)}$$

where $x_i$ and $y_i$ are the reported x and y coordinates for the $i^{th}$ report and $s_x$ and $s_y$ are scalar multiples to convert the pixels to mm along the x and y axes.

This distance may then be multiplied by a scalar factor, a, that is a function of the pressure/force, p. A mapping function, $f$ between the scalar factor and the reported pressure is dependent on material of the tip.

$$\text{Scalar factor:} a_i = f(p_i) \quad \text{(Eq. 2)}$$

The product of the length of travel and the scalar factor is a measure of the wear experienced by the tip as it moved between the two reported points.

$$\text{Tip wear in the current segment:} w_i = a_i * l_i \quad \text{(Eq. 3)}$$

A total amount of wear experienced by the tip may be computed by summing up the amounts of wear from each report, thereby arriving at the total amount of wear experienced by the tip from a particular usage session and/or multiple usage sessions.

Total wear on the tip: $W = \sum_{i=1}^{n} \sqrt{s_x(x_i - x_{i-1})^2 + s_y(y_i - y_{i-1})^2} * f(p_i)$ (Eq. 4)

In another embodiment, the wear model may assume an average pressure/force applied to the tip and accumulate distance over time to determine the amount of wear associated with the tip. This may be performed by the computing device, since the computing tracks location (x/y coordinates), speed of travel, and other movement information of the stylus device in relation to the touch screen of the computing device.

For example, if an average pressure/force is assumed, the computation of the pressure/force mapping function ($f(p_i)$) in Eq. 4 can be replaced with a constant multiplier, k:

Wear estimate: $\tilde{W} = \sum_{i=1}^{n} \sqrt{s_x(x_i - x_{i-1})^2 + s_y(y_i - y_{i-1})^2} * k$ (Eq. 5)

The computing device may then compare the determined amount of wear to one or more threshold values, illustrated as block 510, and determine whether the amount of wear is equal to or greater than a threshold value, illustrated as block 512. When the amount of wear is equal to or greater than the threshold value, the computing device may display a message to the user notifying the user of the amount of wear or life remaining in the tip and/or prompting the user to change the tip, illustrated as block 514. However, if the amount of wear of the tip is less than the threshold value, the computing device may store the amount of wear, and/or other data relating to wear, illustrated as block 516. The process may then proceed back to block 502 and repeat when the stylus device is used again.

The computing device may also update stylus usage/wear information. The amount of wear, and/or other data relating to wear corresponding to a particular tip may be stored on the stylus device, the computing device, and/or transmitted over a network to remote storage by the stylus device or the computing device. In this manner, the amount of wear may be tracked even if the same stylus device is used with multiple different computing devices.

An overall amount of use of the stylus device may also be tracked, for example, through and including multiple tip changes. This may allow for the amount of wear to be predicted in advance based on the use habits. This data may also assist in recommending a certain type of tip to the user to accommodate for the amount of use the stylus device. The overall amount of stylus use may be stored on the stylus device, the computing device, and/or transmitted over a network to remote storage by the stylus device or the computing device. In this manner, the overall amount of stylus use may be tracked even if the same stylus device is used with multiple different computing devices.

Figure 6:
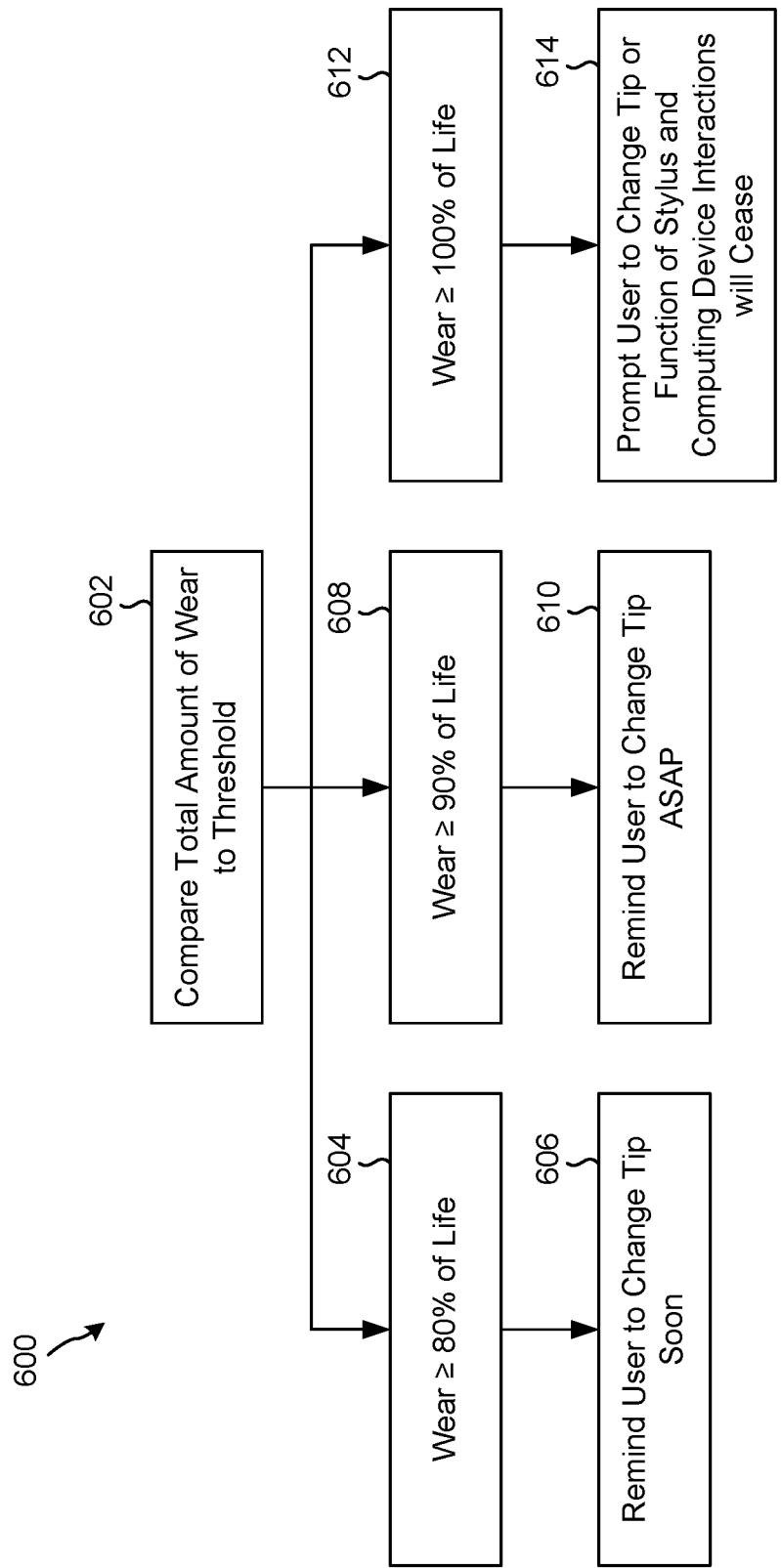
FIG. 6 illustrates an exemplary method of prompting a user to replace a tip of a stylus device according to embodiments of the present disclosure.

As described above, there may be multiple threshold values. Each separate threshold value may correspond to a different message or prompt to the user. For example, the closer the amount of wear is to the life of the tip, the greater the warning. Thus, the message or prompt may escalate based on the amount of wear or life remaining in the tip. FIG. 6 illustrates a method 600 of handling some exemplary thresholds according to embodiments of the present disclosure. As illustrated, the amount of wear is compared to one or more threshold values, illustrated as block 602. When the amount of wear is equal to or greater than about 80% of the life of the tip (meaning that about 20% of life remains in the tip), illustrated as block 604, the user may be reminded to change the tip soon, illustrated as block 606. When the amount of wear is equal to or greater than about 90% of the life of the tip (meaning that about 10% of life remains in the tip), illustrated as block 608, the user may be reminded to change the tip as soon as possible, illustrated as block 610. When the amount of wear is equal to or greater than about 100% of the life of the tip (meaning that about 0% of life remains in the tip), illustrated as block 612, the user may be prompted to change the tip or the functionality of the interactions between the stylus device and the computing device will cease, illustrated as block 614. The illustrated percentages/indicators are configurable based on desired system operation.

In other examples, the computing device may automatically order a new tip for the user when the amount of wear reaches a threshold. The computing device may notify the user that a warranty on the stylus device or the computing device is void when the amount of wear reaches a threshold, and a notification of the warranty void may be sent to the entity that issued the warranty. It should be appreciated that any other type of message or prompt may be implemented in response to the amount of wear reaching a threshold.

Figure 7:
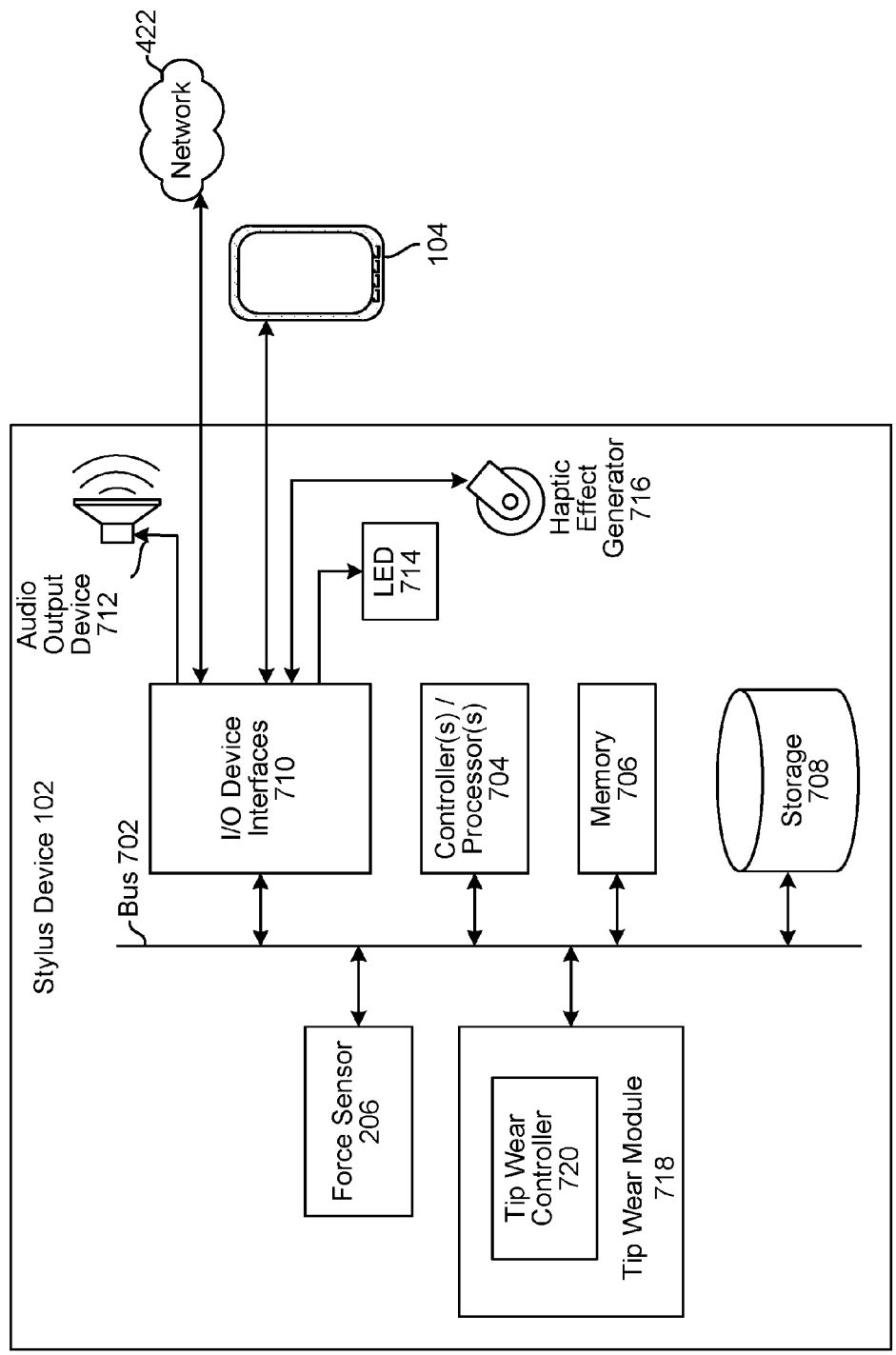
FIG. 7 is a block diagram conceptually illustrating example components of a stylus device according to embodiments of the present disclosure.

The stylus device may alternatively or additionally determine/calculate an amount of life remaining in the tip and notify a user and/or cause a prompt to be displayed to the user of the amount of life remaining and/or to replace the tip. FIG. 7 is a block diagram conceptually illustrating example components of the stylus device 102. In operation, the stylus device 102 may include computer-readable and computer-executable instructions that reside on the stylus device 102, as will be discussed further below.

As illustrated in FIG. 7, the stylus device 102 may include an address/data bus 702 for conveying data among components of the stylus device 102. Each component within the stylus device 102 may also be directly connected to other components in addition to (or instead of) being connected to other components across the bus 702.

The stylus device 102 may include one or more microcontrollers/controllers/processors 704 that may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The stylus device 102 may also include a data storage component 708, for storing data and microcontrollers/controller/processor-executable instructions (e.g., instructions to perform one or more steps of the methods illustrated in FIGS. 6 and 8). The data storage component 708 may include one or more non-volatile storage types such as magnetic storage, optical storage, solid-state storage, etc. The stylus device 102 may also be connected to removable or external non-volatile memory and/or storage (such as a removable memory card, memory key drive, networked storage, etc.) through the input/output device interfaces 710.

Instructions for operating the stylus device 102 and its various components may be executed by the microcontroller(s)/controller(s)/processor(s) 704, using the memory 706 as temporary "working" storage at runtime. The instructions may be stored in a non-transitory manner in non-volatile memory 706, storage 708, or an external device. Alternatively, some or all of the executable instructions may be embedded in hardware or firmware in addition to or instead of software.

The stylus device 102 includes input/output device interfaces 710. A variety of components may be connected through the input/output device interfaces 710, such as an audio output device for producing sound, such as speaker(s) 712; a light emitting diode (LED) 714; a haptic generator 716; and/or other components, such as a display; one or more audio capture device(s), such as a microphone or an array of microphones; buttons; and other components. The speaker(s) 714, the LED 714, the haptic generator 716 and other components may be integrated into the stylus device 102 or may be separate.

The input/output device interfaces 710 may also include an interface for an external peripheral device connection such as universal serial bus (USB), FireWire, Thunderbolt or other connection protocol. The input/output device interfaces 410 may also include a connection to one or more wireless networks, such as a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus device 102 may connect to the computing device 104 via one of these connections. Additionally, in some embodiments, the computing device 104 and the stylus device 102 may communicate using electromagnetic communications (for example, electric fields generated by each device to transmit data on a carrier frequency).

The stylus device 102 further includes the force sensor 206. As described above, there may be more than one force sensor, and the force sensor(s) 206 may measure an amount of force (for example, pressure, shear, and any other force in any direction) at the tip of the stylus device 102, and may be for example, an optical pressure sensor, a capacitive pressure sensor, a piezoelectric sensor, a piezoelectric resistive sensor, or other sensor capable of measuring pressure and/or force.

The stylus device 102 further includes a tip wear module 718 that receives pressure information from the force sensor 206. The tip wear module 718 may include a tip wear controller 720. The tip wear controller 720 may determine/calculate the amount of wear and/or life remaining in the tip based on the pressure information and time information and notify and/or cause one or more messages to be displayed to the user on the computing device 104 relating to or corresponding to the amount of wear and/or life remaining in the tip (for example, a prompt to replace the tip). To determine/calculate the amount of wear and/or life remaining in the tip, the tip wear module 718/tip wear controller 720 may be programmed with or access from the storage 708 a number of tip wear models. The tip wear module 718/tip wear controller 720 may execute the appropriate wear model corresponding to the type of tip being used.

Figure 8:
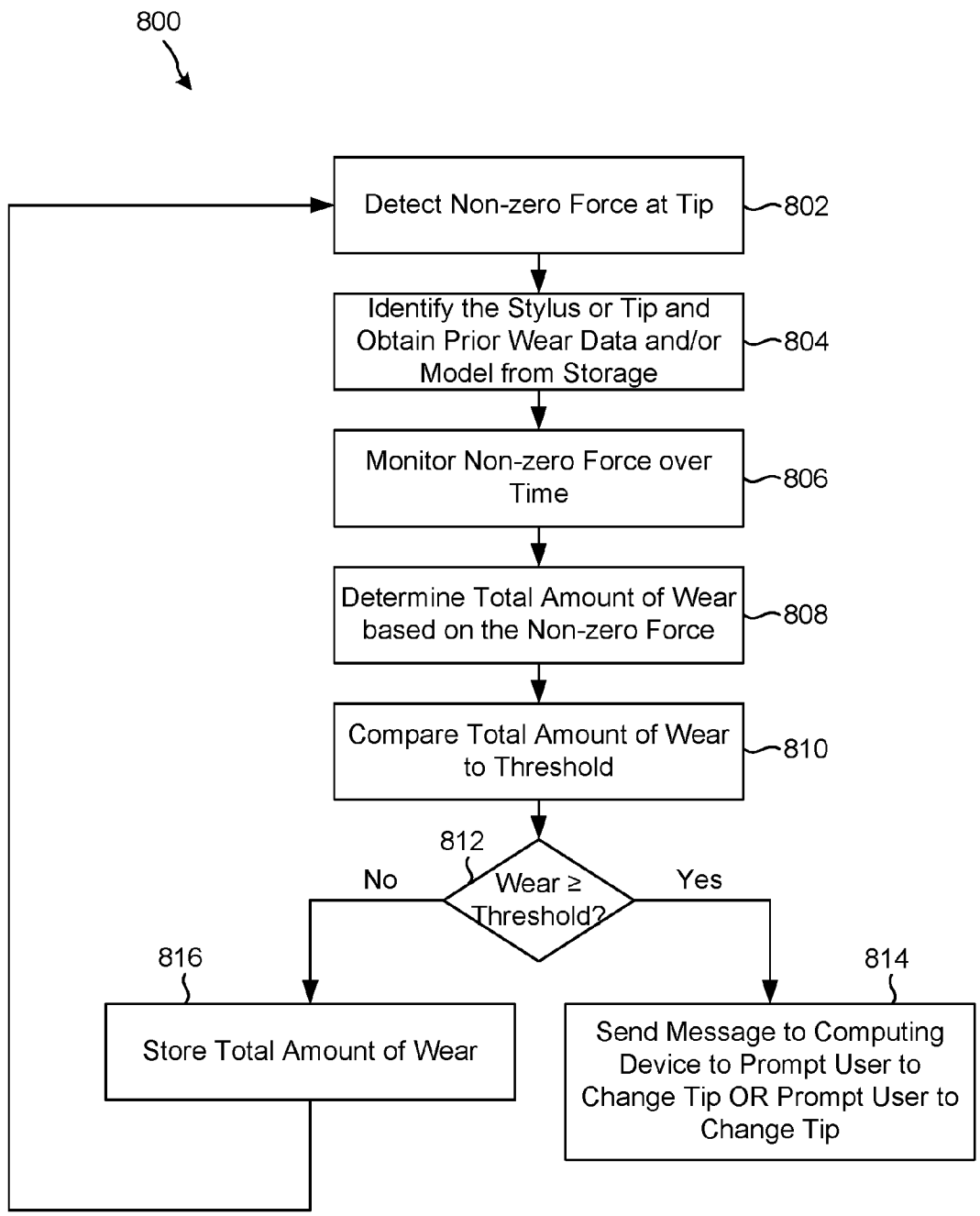
FIG. 8 illustrates an exemplary method of determining when to replace a tip of a stylus device according to embodiments of the present disclosure.

FIG. 8 illustrates an exemplary method 800 of determining when to replace a tip of a stylus device according to embodiments of the present disclosure. As illustrated, the stylus device detects when a stylus device is in contact with the touchscreen of the computing device by detecting a non-zero force measurement, illustrated as block 802. The stylus device identifies the tip being used and obtains any prior wear data and wear model(s) associated with the tip from storage, illustrated as block 804. As described above, the tip may be identified from a data element in the tip, an electrical impedance associated with the tip, user input or selection, message from the computing device, or other mechanism.

As the stylus is being used, the stylus device monitors non-zero force measurements over time (for example, force and/or pressure curves), illustrated as block 806. The stylus device then determines an amount of wear associated with the tip based on the force and time information, illustrated as block 808. This may be performed by calculating the amount of wear using the appropriate wear model, any prior wear data and the recently monitored non-zero force and time information. In this example, the wear model may be based on pressure curves and time to arrive at an amount of wear. For example, a high force measurement lasting for a short period of time (such as about 10 newton of force for about 1 second of time) may result in a similar amount of wear for a low force measurement lasting a longer period of time (such as about 1 newton of force for about 10 seconds of time). Other calculations are also possible.

In one example, the stylus device may assume a constant writing speed. In this example, the length/distance of travel $$\left(\sqrt{s_x(x_i - x_{i-1})^2 + s_y(y_i - y_{i-1})^2}\right)$$

in Eq. 4 above can be replaced with a constant, m. This assumption can be useful when the stylus device is performing the computation of the amount wear since the stylus device may not monitor distance traveled by the tip.

Wear estimate: $\tilde{W} = \Sigma_{i=1}^{n} m * f(p_i)$ (Eq. 6)

The stylus device may then compare the determined amount of wear to one or more threshold values, illustrated as block 810, and determine whether the amount of wear is equal to or greater than a threshold value, illustrated as block 812. When the amount of wear is equal to or greater than the threshold value, the computing device may notify the user and/or send a message to the computing device to display a message to the user notifying the user of the amount of wear or life remaining in the tip and/or prompting the user to change the tip, illustrated as block 814. The stylus device may notify the user, for example, by flashing and/or illuminating the LED 714 (illustrated in FIG. 7), emitting a sound via the speaker(s) 712, and/or providing a vibration via the haptic generator 716 (illustrated in FIG. 7).

However, if the amount of wear of the tip is less than the threshold value, the computing device may store the amount of wear, and/or other data relating to wear, illustrated as block 816. Updated wear information may also be sent to one or more other devices that track tip wear such as computing device 104 or a central server. The process may then proceed back to block 802 and repeat when the stylus device is used again and a non-zero force is detected. The stylus device may include multiple threshold values as described above with respect to the computing device and with respect to FIG. 6.

It should be appreciated that one or more of the functional components illustrated in and described with reference to FIGS. 1-3, 4, and 7 may perform one or more of the steps of the methods illustrated in and described with reference to FIGS. 5, 6, and 8.

Figure 9:
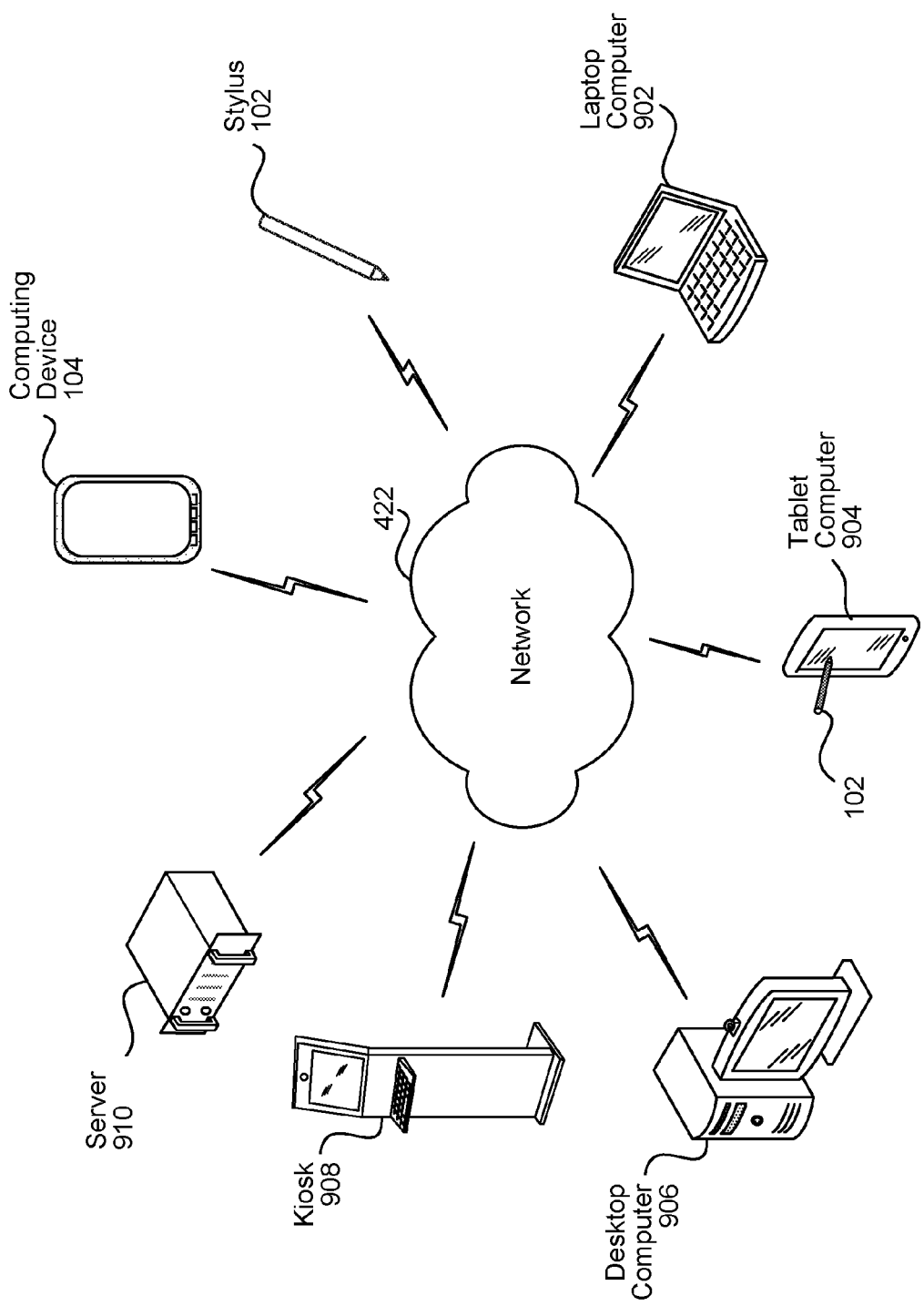
FIG. 9 illustrates exemplary devices that a stylus device and computing device may communicate with according to embodiments of the present disclosure.

The amount of wear, and/or other data relating to wear corresponding to a particular tip may be stored on the stylus device, the computing device, and/or transmitted over a network to remote storage or cloud storage by the stylus device or the computing device. In this manner, the stylus device and the amount of wear may be tracked across devices, even if the same stylus device is used with multiple different computing devices. The stylus device and/or the tip may also have an ID for tracking purposes. Referring to FIG. 9, the stylus device 102 and the computing device 104 may communicate with each other or another device through the network 422. As described above, the network 422 may be a wireless local area network (WLAN) (such as WiFi) radio, Bluetooth, infrared (IR), and/or wireless network radio, such as a radio capable of communication with a wireless communication network such as a Long Term Evolution (LTE) network, WiMAX network, 3G network, etc. For example, the stylus device 102 and/or the computing device 104 may communicate with a laptop computer 902, a tablet computer 904, a desktop computer 906, a kiosk 908, a server 910, or other device to store and/or retrieve the amount of wear and/or other data relating to wear corresponding to a particular tip.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving, from a force sensor of a stylus, force data;
   determining the force data represents a non-zero force;
   determining stored prior wear data associated with a tip of the stylus;
   determining, using the force data, a current amount of use of the tip;
   determining, based on the stored prior wear data and the current amount of use, a total amount of wear of the tip;
   determining a wear model associated with the tip, the wear model including a wear threshold;
   determining the total amount of wear meets or exceeds the wear threshold; and
   providing, based on the total amount of wear meeting or exceeding the wear threshold, an indication representing the tip should be replaced.

2. The method of claim 1, further comprising:
   determining the total amount of wear is less than the wear threshold; and
   providing, based on the total amount of wear being less than the wear threshold, a second indication representing a remaining amount of wear before the total amount of wear meets or exceeds the wear threshold.

3. The method of claim 1, wherein the indication includes at least one of a visual output, an audible output, or a tactile output.

4. The method of claim 1, further comprising determining identification data corresponding to an identifier of at least one of the tip or the stylus, wherein the wear model if further determined based at least in part on the identification data.

5. The method of claim 4, wherein the stored prior wear data is further determined based at least in part on the identification data.

6. The method of claim 1, further comprising sending a signal to a remote device, the signal including data corresponding to the total amount of wear.

7. The method of claim 1, further comprising:
   determining an electrical impedance associated with the tip; and
   determining the wear model based at least in part on the electrical impedance.

8. The method of claim 7, wherein the electrical impedance is based on a type of polymer coating of the tip.

9. A stylus device, comprising:
   at least one processor;
   a force sensor; and
   memory including instructions that, when executed by the at least one processor, cause the stylus device to:
      receive force data from the force sensor;
      determine the force data represents a non-zero force;
      determine stored prior wear data associated with a tip of the stylus device;
      determine, using the force data, a current amount of use of the tip;
      determine, based on the stored prior wear data and the current amount of use, a total amount of wear of the tip;
      determine a wear model associated with the tip, the wear model including a wear threshold;
      determine the total amount of wear meets or exceeds the wear threshold; and
      provide, based on the total amount of wear meeting or exceeding the wear threshold, an indication representing the tip should be replaced.

10. The stylus device of claim 9, wherein the instructions, when executed by the at least one processor, causing the stylus device to provide the indication further cause the stylus device to send a signal to a remote device, the signal instructing the remote device to notify a user to change the tip.

11. The stylus device of claim 9, wherein the instructions, when executed by the at least one processor, further cause the stylus device to:
   determine the total amount of wear is less than the wear threshold; and provide, based on the total amount of wear being less than the wear threshold, a second indication representing a remaining amount of wear before the total amount of wear meets or exceeds the wear threshold.

12. The stylus device of claim 9, wherein the indication includes at least one of a visual output, an audible output, or a tactile output.

13. The stylus device of claim 9, wherein the instructions, when executed by the at least one processor, further cause the stylus device to send a signal to a remote device, the signal including data corresponding to the total amount of wear.

14. The stylus device of claim 9, wherein the instructions, when executed by the at least one processor, further cause the stylus device to:
  determine an electrical impedance associated with the tip; and
  determine the wear model based at least in part on the electrical impedance.

15. The stylus device of claim 14, wherein the electrical impedance is based on a type of polymer coating of the tip.

* * * * *